US008303749B2

(12) United States Patent
Lee

(10) Patent No.: US 8,303,749 B2
(45) Date of Patent: Nov. 6, 2012

(54) METHOD FOR MANUFACTURING COMPOSITE FILM

(76) Inventor: Chien-Hung Lee, Jhonghe (TW)

( * ) Notice: Subject to any disclaimer, the term of this patent is extended or adjusted under 35 U.S.C. 154(b) by 97 days.

(21) Appl. No.: 12/637,752

(22) Filed: Dec. 15, 2009

(65) Prior Publication Data

US 2011/0083798 A1    Apr. 14, 2011

(30) Foreign Application Priority Data

Oct. 13, 2009 (TW) ................. 98134638 A

(51) Int. Cl.
B29C 47/06 (2006.01)
B43L 1/00 (2006.01)
B32B 9/04 (2006.01)

(52) U.S. Cl. ........ 156/245; 156/243; 156/315; 434/408; 434/425; 428/32.26; 428/447; 106/32.5

(58) Field of Classification Search ............... 428/32.26, 428/32.38; 106/32.5; 434/408, 425
See application file for complete search history.

(56) References Cited

U.S. PATENT DOCUMENTS

| 2,029,273 | A | * | 1/1936 | Montgomery et al. | ........ 101/483 |
| 3,031,352 | A | * | 4/1962 | Bobear | ........ 524/280 |
| 3,288,879 | A | * | 11/1966 | Safford | ........ 525/105 |
| 3,483,270 | A | * | 12/1969 | Bostick | ........ 525/105 |
| 3,528,940 | A | * | 9/1970 | Modic | ........ 524/493 |
| 3,927,695 | A | * | 12/1975 | Crockwell | ........ 138/137 |
| 4,133,938 | A | * | 1/1979 | Bingham | ........ 428/447 |
| 4,242,383 | A | * | 12/1980 | Goossens et al. | ........ 427/387 |
| 5,688,494 | A | * | 11/1997 | Graves et al. | ........ 424/61 |
| 2005/0125924 | A1 | * | 6/2005 | Benjamin et al. | ........ 15/104.94 |
| 2008/0193696 | A1 | * | 8/2008 | Hayes | ........ 428/41.8 |
| 2008/0218865 | A1 | * | 9/2008 | Iwata et al. | ........ 359/601 |

FOREIGN PATENT DOCUMENTS

| EP | 279579 A1 * | 8/1988 |
| JP | 08164700 A * | 6/1996 |
| WO | WO 9102607 A1 * | 3/1991 |

OTHER PUBLICATIONS

Machine translation of Wakaura, Japanese Patent Publication No. JP-08164700A, 24 pages.*

* cited by examiner

Primary Examiner — William Bell

(57) ABSTRACT

The present invention is related to a method for manufacturing composite film. The method includes the following steps: a substrate is provided; an interface agent is uniformly spread on the substrate; a silicone compound is uniformly spread on the interface agent; a first mold processed with sandblasting is provided; the substrate and the silicone compound are disposed inside the first mold so that the silicone compound is contacted to the inner surface of the first mold; the substrate and the silicone compound are vulcanized by a predetermined time; afterward, a composite film with a writing layer and the substrate is formed. The present invention is characterized in that the silicone compound is uniformly mixed with 37.5% of first silicone, 37.5% of second silicone and 25% of dimethicone; the glass sand is composed of particles with diameter of 75±25 μm and 125±25 μm by proportion of 1:9.

7 Claims, 8 Drawing Sheets

METHOD FOR MANUFACTURING COMPOSITE FILM

FIELD OF THE INVENTION

The present invention relates to a method for manufacturing composite film, particularly to the method for manufacturing a composite film with functions of writing, attaching and sticking.

DESCRIPTION OF THE PRIOR ART

Writing film is kind of common stationery which is generally manufactured with plastic, resin or acrylic board. The writing film is writable, weightless and thin, as well as printable and cuttable according demand, thus, its relative products can be extremely diversified and the usage is so widespread.

However, such kind of writing film is normally lack of stickiness or adhesion. Besides, due to characteristic of the surface tension within the ink, the writing film may not be easily written on said writing film by erasable marker, namely the ink of erasable marker will be difficult to adhere to. Therefore, it would be inconvenient to stick draft paper on the writing film or write something with erasable marker. Moreover, if the writing film is written with permanent marker by accident, it would need some chemical solvent to clean the sedimentary ink; and that will put human in the environment with carcinogenic substances. Regarding to the lack of stickiness in the writing film, it can not be pasted on the wall, mirror or door of the refrigerator according to someone's wish; this will limit its usage and application for SOHO, too.

In this reason, how to improve those writing, erasing and sticking problems, making the writing film more accessible and convenient for people to use and widening its usage, is a critical issue remains to be solved.

SUMMARY OF THE INVENTION

The primary object of present invention is to improve writing, erasing and sticking problems, making the writing film more accessible and convenient for people to use and widening its usage.

To achieve the foregoing and other objects, a method for manufacturing composite film is provided. The method includes the following steps: providing a substrate; uniformly spreading an interface agent on the substrate; uniformly spreading a silicone compound on the interface agent; providing a first mold processed with sandblasting in the inner surface of the first mold by glass sand; disposing the substrate and the silicone compound inside the first mold so that the silicone compound is contacted to the inner surface of the first mold; vulcanizing the substrate and the silicone compound by a predetermined time; and then forming a composite film with a writing layer and the substrate. The present invention is characterized in that the silicone compound is uniformly mixed with 37.5% of first silicone, 37.5% of second silicone and 25% of dimethicone; the glass sand is composed of particles with diameter of 75±25 μm and 125±25 μm by proportion of 1:9. Wherein the first silicone is polydimethylsiloxane containing vinyl groups with platinum catalyst and inhibitors, and the second silicone is polydimethylsiloxane containing vinyl groups with fillers of a cross-linker and an inhibitor.

In the aforementioned method for manufacturing composite film, wherein the vulcanizing pressure is 34±10 kg/cm2, the vulcanizing temperature is 115±7° C. and the predetermined time is 70~130 seconds.

In the aforementioned method for manufacturing composite film, wherein the substrate can be plastic, resin or polymer.

In the aforementioned method for manufacturing composite film, wherein the interface agent is composed of acrylate resin, isopropyl alcohol, ethyl acetate and tolyl silane coupling agent.

In the aforementioned method for manufacturing composite film, wherein the time of mixing the first silicone, second silicone and the dimethicone is 10~15 minutes.

In the aforementioned method for manufacturing composite film, wherein the thickness of the silicone compound is 0.1~0.3 mm.

To achieve the foregoing and other objects, another method for manufacturing composite film is provided. The method includes the following steps: providing a substrate; uniformly spreading an interface agent on the substrate; uniformly spreading a silicone compound on the interface agent; providing a second mold processed with polishing and electroplating in the inner surface of the second mold; disposing the substrate and the silicone compound inside the second mold so that the silicone compound is contacted to the processed inner surface of the second mold; vulcanizing the substrate and the silicone compound by a predetermined time; and then forming a composite film with an attaching layer and the substrate. The present invention is characterized in that the silicone compound is uniformly mixed with 37.5% of first silicone, 37.5% of second silicone and 25% of dimethicone. Wherein the first silicone is polydimethylsiloxane containing vinyl groups with platinum catalyst and inhibitors, and the second silicone is polydimethylsiloxane containing vinyl groups with fillers of a cross-linker and an inhibitor.

In the aforementioned method for manufacturing composite film, wherein the covered metal of electroplating is aluminum or chromium.

To achieve the foregoing and other objects, yet another method for manufacturing composite film is provided. The method includes the following steps: providing a substrate; uniformly spreading an interface agent on the substrate; uniformly spreading a third silicone on the interface agent; providing a third mold processed with sandblasting in the inner surface of the third mold by glass sand; disposing the substrate and the third silicone inside the third mold so that the third silicone is contacted to the inner surface of the third mold; vulcanizing the substrate and the third silicone by a predetermined time; and then forming a composite film with a sticking layer and the substrate. The present invention is characterized in that the third silicone is composed of siloxane and silicon dioxide, and particle diameter of the glass sand is 125±25 μm.

Whereby, the manufacturing method of these composite films can be achieved by one process incorporating distinct raw materials or distinct mold; then, different types of composite films may be produced. In this manner, these composite films can have functions of writing, attaching or sticking. Moreover, when these layers are combined, usage of these composite films can be diversified.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1A:
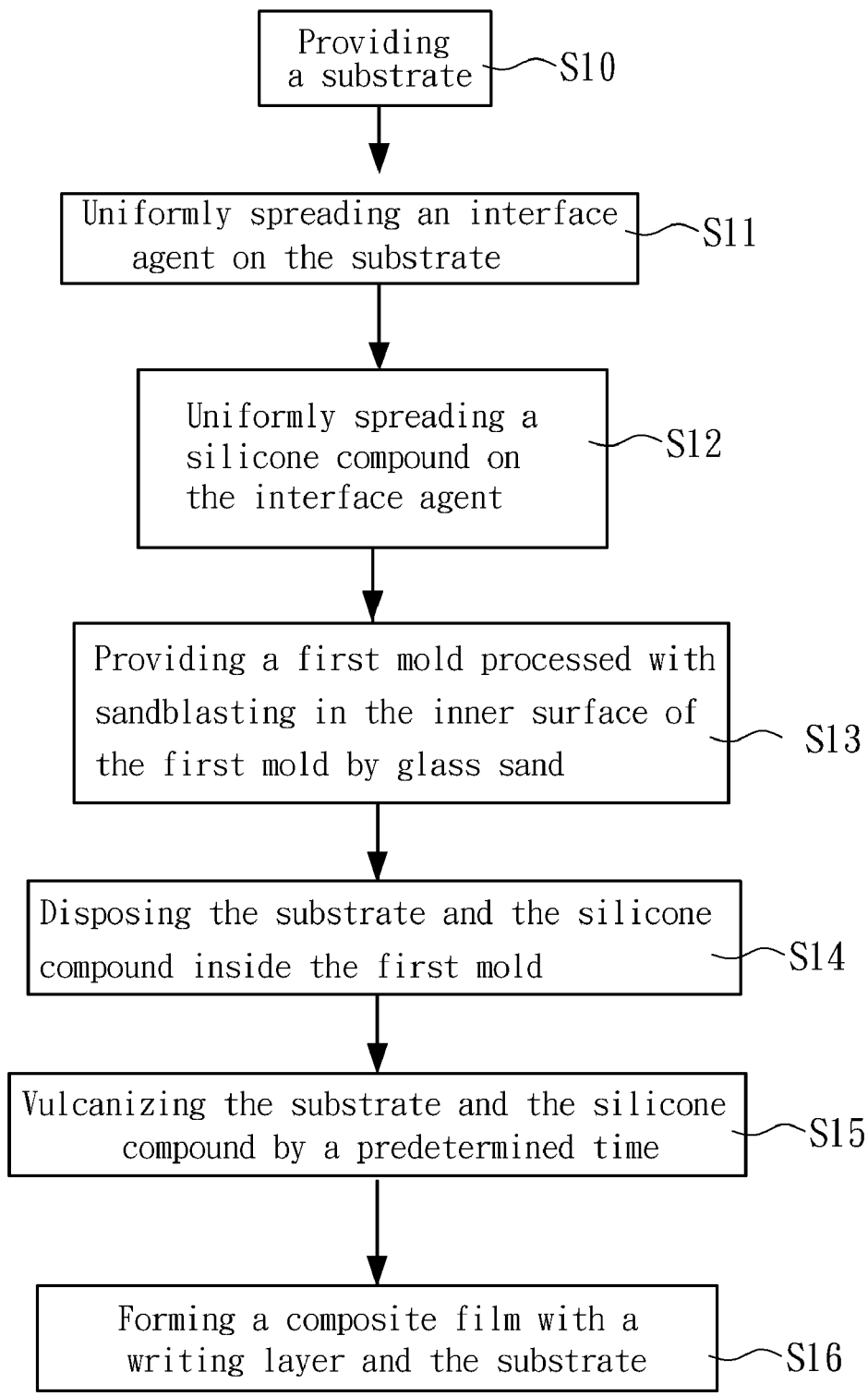
FIG. 1A is diagram of method for manufacturing the A-type composite film.

Please refer to FIG. 1A, FIG. 1A is diagram of method for manufacturing the A-type composite film. As shown in FIG. 1A, the manufacturing method includes the following: step S10, a substrate is provided. The substrate can be plastic, resin or polymer such as Polyethylene Terephthalate (PET), Polycarbonate (PC), Tri-acetyl Cellulose (TAC), Polymethylmethacrylate (PMMA), Methylmethacrylate styrene, Polystyrene (PS), Cyclic Olefin Copolymer (COC), Polyethylene (PE) or Polyvinyl chloride (PVC).

Then, step S11, an interface agent is uniformly spread on the substrate. The interface agent is composed of acrylate resin, isopropyl alcohol, ethyl acetate and tolyl silane coupling agent.

Next, step S12, a silicone compound is uniformly spread on the interface agent by thickness of 0.1~0.3 mm. The silicone compound is produced by uniformly mixing 37.5% of first silicone, 37.5% of second silicone and 25% of dimethicone for 10~15 minutes. Wherein the first silicone is polydimethylsiloxane containing vinyl groups with platinum catalyst and inhibitors, and the second silicone is polydimethylsiloxane containing vinyl groups with fillers of a cross-linker and an inhibitor.

Step S13, a first mold processed with sandblasting, i.e. bombarded with countless tiny particles, in the inner surface of the first mold by glass sand is provided. The glass sand is composed of particles with diameter of 75±25 µm and 125±25 µm by proportion of 1:9.

Step S14, the substrate and the silicone compound are disposed inside the first mold so that the silicone compound is contacted to the inner surface of the first mold.

Step S15, the substrate and the silicone compound are vulcanized with 34±10 kg/cm2 of vulcanizing pressure and 115±7° C. of vulcanizing temperature for a predetermined time of as long as 70~130 seconds.

Figure 2A:
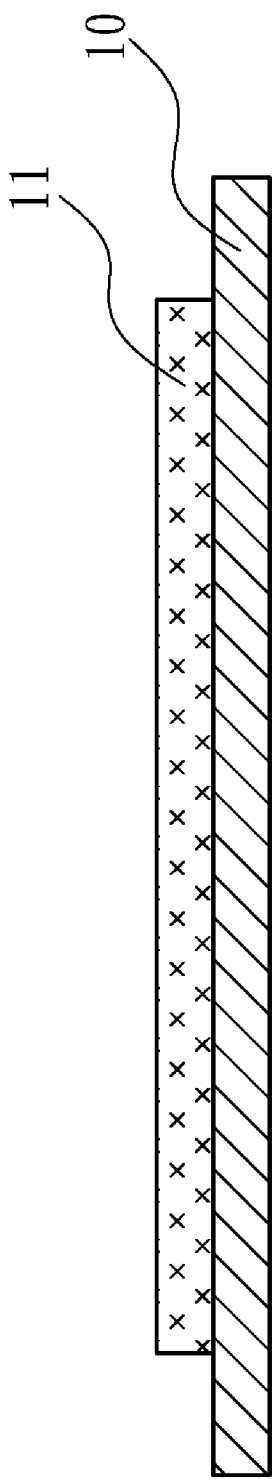
FIG. 2A is diagram of configuration of A-type composite film.

Then, step S16, after vulcanization, the silicone compound and the substrate can be translated into an A-type composite film 1 with a writing layer 11 and substrate 10, where the A-type composite film 1 is shown in FIG. 2A. In doing this, the purpose of the aforementioned interface agent is to couple the silicone compound and the substrate 10. The purpose of sandblasting inside the first mold is to bombard its inner surface so as to equip the writing layer 11 with countless concave/convex structures, and then the writing layer 11 may has a rough and uneven surface. The relevant influence is: if it's too smooth on the surface of the writing layer 11, the ink of erasable marker will be difficult to adhere to the surface of writing layer 11 due to the effect of surface tension in the ink. On the other hand, if it's too rough on the surface of the writing layer 11, the ink of a permanent marker will be difficult to erase. Therefore, in order to easily write or erase the ink of both erasable marker and permanent marker, the roughness on the surface of the writing layer 11 will become critical factor. Thus, after experiments, it is found that the problem can be settled by sandblasting the inner surface of the first mold with glass sands which have distinct diameters as described in step S13. Then, after vulcanization, the surface of the writing layer 11 is become slight rough with countless concave/convex structure so that ink of both erasable marker and permanent marker can be easily adhered to or erased from the writing layer 11, no need to worry about the surface tension and erasability. In this manner, it is shown by experiments that the ink on the writing layer 11 can be erased by toilet paper, rag, wiper or cleaned by water. Therefore, the A-type composite film 1 with writing layer 11 may have the function of repeated erasability, flushability and writability.

Figure 1B:
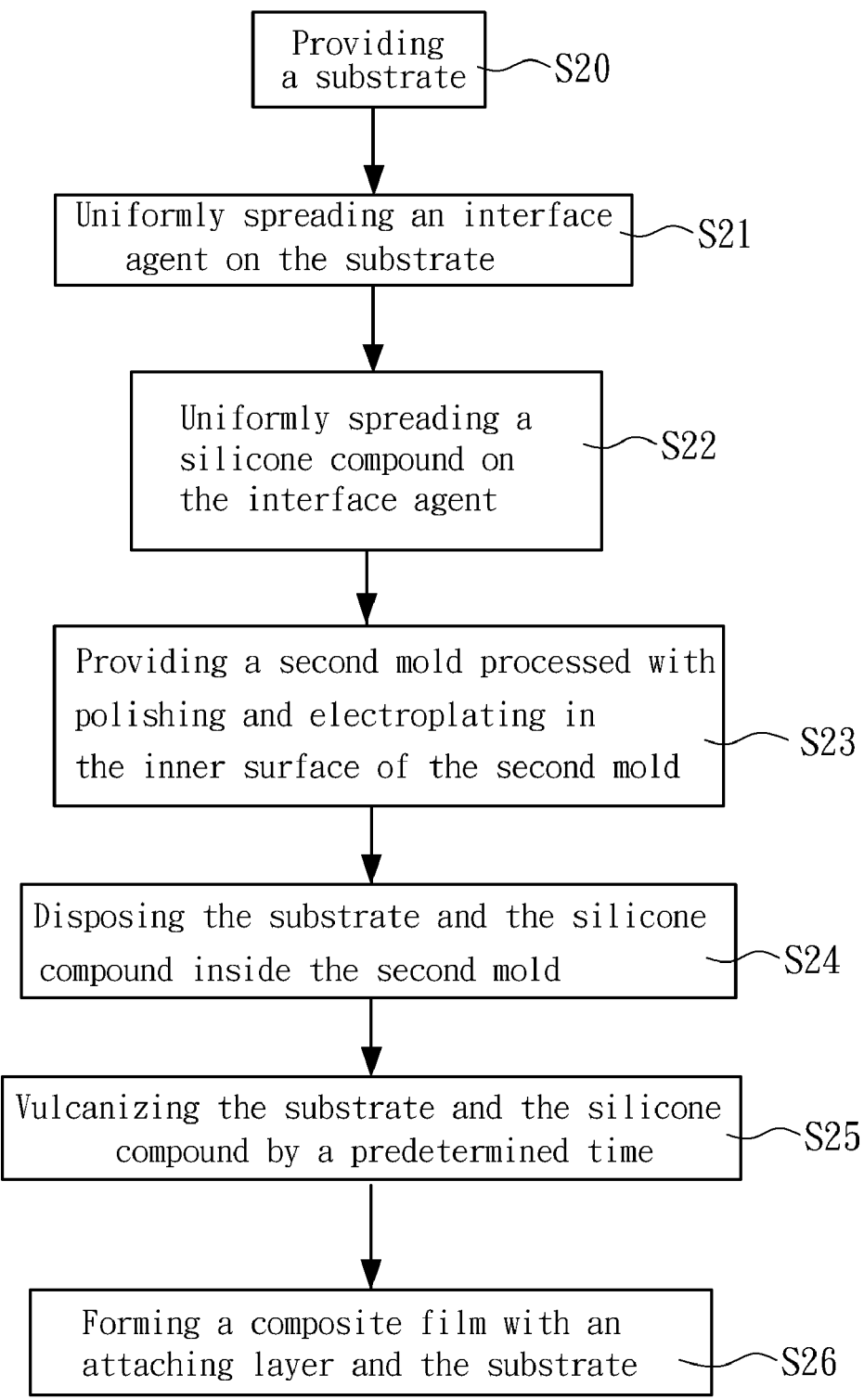
FIG. 1B is diagram of method for manufacturing the B-type composite film.

Next, another type of composite film is introduced. Please refer to FIG. 1B, FIG. 1B is diagram of method for manufacturing the B-type composite film. As shown in FIG. 1B, the manufacturing method includes the following: step S20, a substrate is provided. Step S21, an interface agent is uniformly spread on the substrate. Step S22, a silicone compound is uniformly spread on the interface agent. Wherein, the substrate, interface agent and the silicone compound are the same as described in FIG. 1A.

Next, step S23, a second mold is provided. The second mold is processed with polishing in its inner surface so that the inner surface of the second mold is become extreme smooth. And then the inner surface is electroplated with specific covered metal such as aluminum or chromium, so as to achieve Ra (Average Roughness)=0.01~0.05 µm.

Then, step S24, the substrate and the silicone compound are disposed inside the second mold so that the silicone compound is contacted to the electroplated inner surface. Step S25, the substrate and the silicone compound are vulcanized with 34±10 kg/cm2 of vulcanizing pressure and 115±7° C. of vulcanizing temperature for a predetermined time of as long as 70~130 seconds.

Figure 2B:
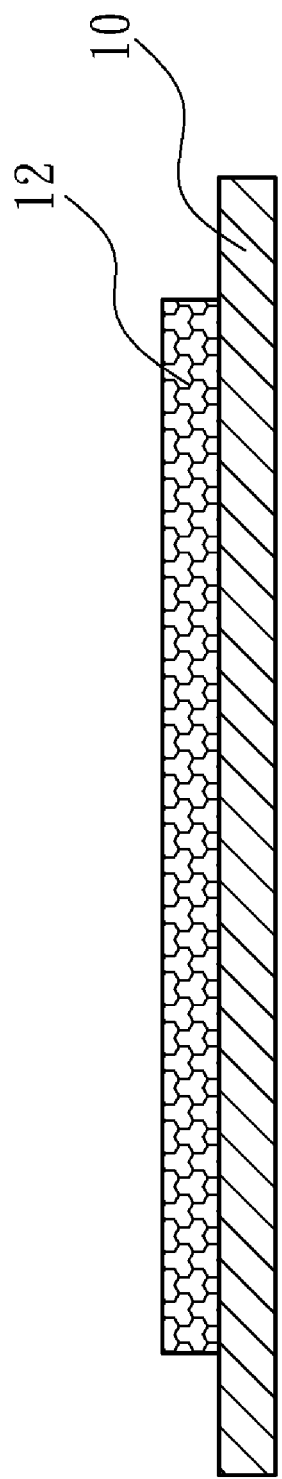
FIG. 2B is diagram of configuration of B-type composite film.
Figure 4:
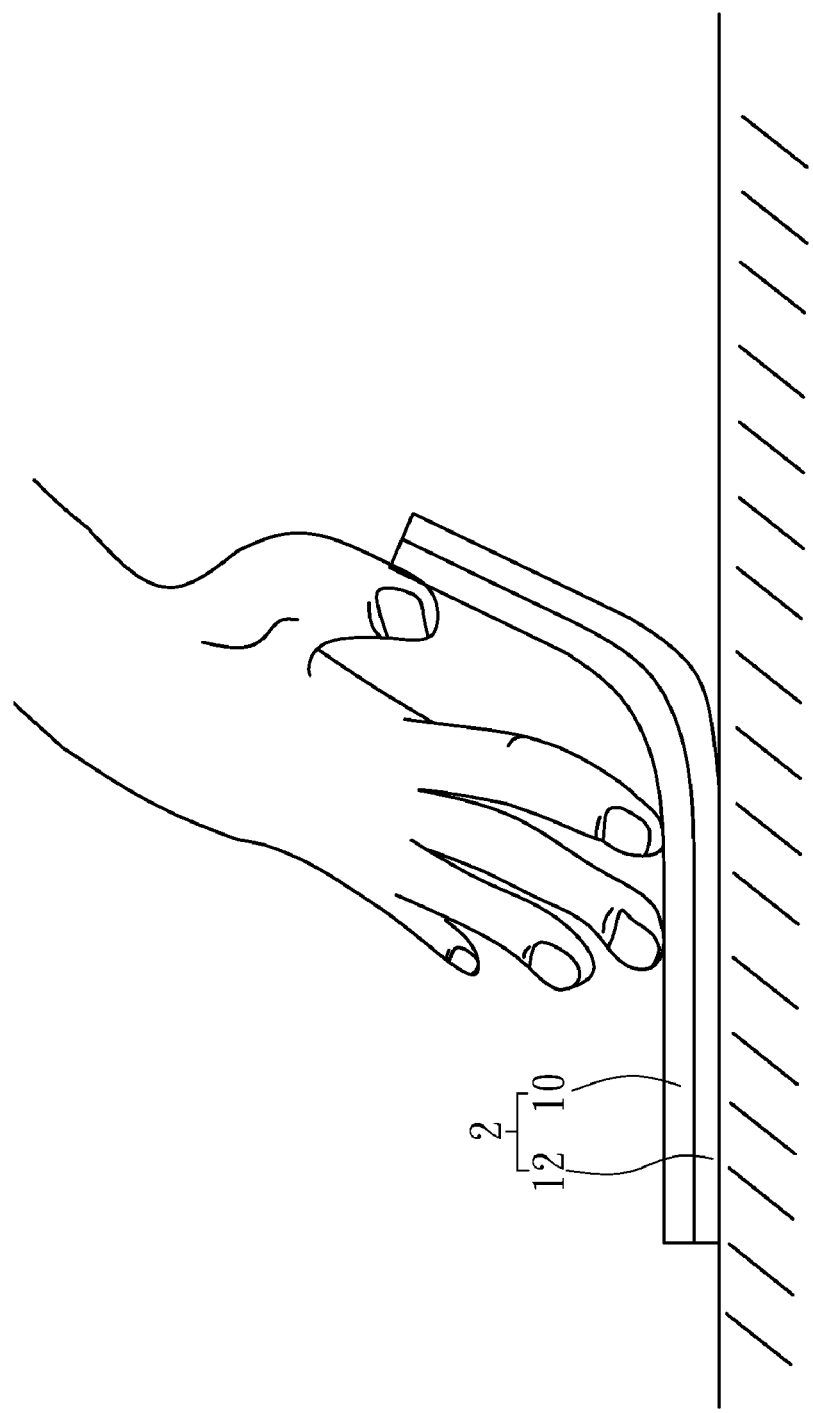
FIG. 4 is diagram of usage of B-type composite film.

Afterward, step S26, the silicone compound and the substrate can be translated into a B-type composite film 2 with an attaching layer 12 and substrate 10, where the B-type composite film 2 is shown in FIG. 2B. As for the difference between the A-type composite film 1 and B-type composite film 2, due to the contacted inner surface of the first mold or the second mold which have their own roughness, the silicone compound can be vulcanized and then translated into a writing layer 11 or attaching layer 12 respectively. Thus, the difference between the writing layer 11 and the attaching layer 12 is their roughness. As described before, due to that the inner surface of the second mold is processed with polishing and electroplating, the inner surface of the second mold will become approximately ideal plane; as the result, the silicone compound will be consequently translated into the attaching layer 12 which may become approximately ideal plane. Please refer to FIG. 4, when the B-type composite film 2 is used, the attaching layer 12 is contacted to a smooth plane such as mirror or glass, and then the top surface of the B-type composite film 2 is pushed by hand, so as to squeeze the air out of the space between the attaching layer 12 and the smooth plane. After the B-type composite film 2 is entirely attached to the smooth plane, the tiny space between the attaching layer 12 and the smooth plane will approximate to vacuum. In this manner, due to pressure difference, the B-type composite film 2 may sustain enormously horizontal drawing force. Please refer to Table 1, Table 1 is experimental data of horizontally sustainable drawing force of B-type composite film 2. In these experiments, the average horizontally sustainable force which B-type composite film 2 can sustain is 0.995 kg/cm2. Wherein, the term "horizontally" means that the direction of sustainable drawing force is parallel to the B-type composite film 2. Besides, while the B-type composite film 2 is suffered frequently used and then attached dust on the attaching layer 12, the attaching layer 12 can be easily regained its capability to attach as long as been cleaned the dust by water.

TABLE 1

| Experiment No. | 1 | 2 | 3 | 4 | 5 |
|---|---|---|---|---|---|
| drawing force (kg/cm$^2$) | 0.93 | 0.86 | 0.95 | 1.17 | 0.94 |
| Experiment No. | 6 | 7 | 8 | 9 | 10 |
| drawing force (kg/cm$^2$) | 0.94 | 0.88 | 1.03 | 1.24 | 1.01 |

✕ Horizontally sustainable drawing force is 0.995 kg/cm$^2$ in average

Figure 1C:
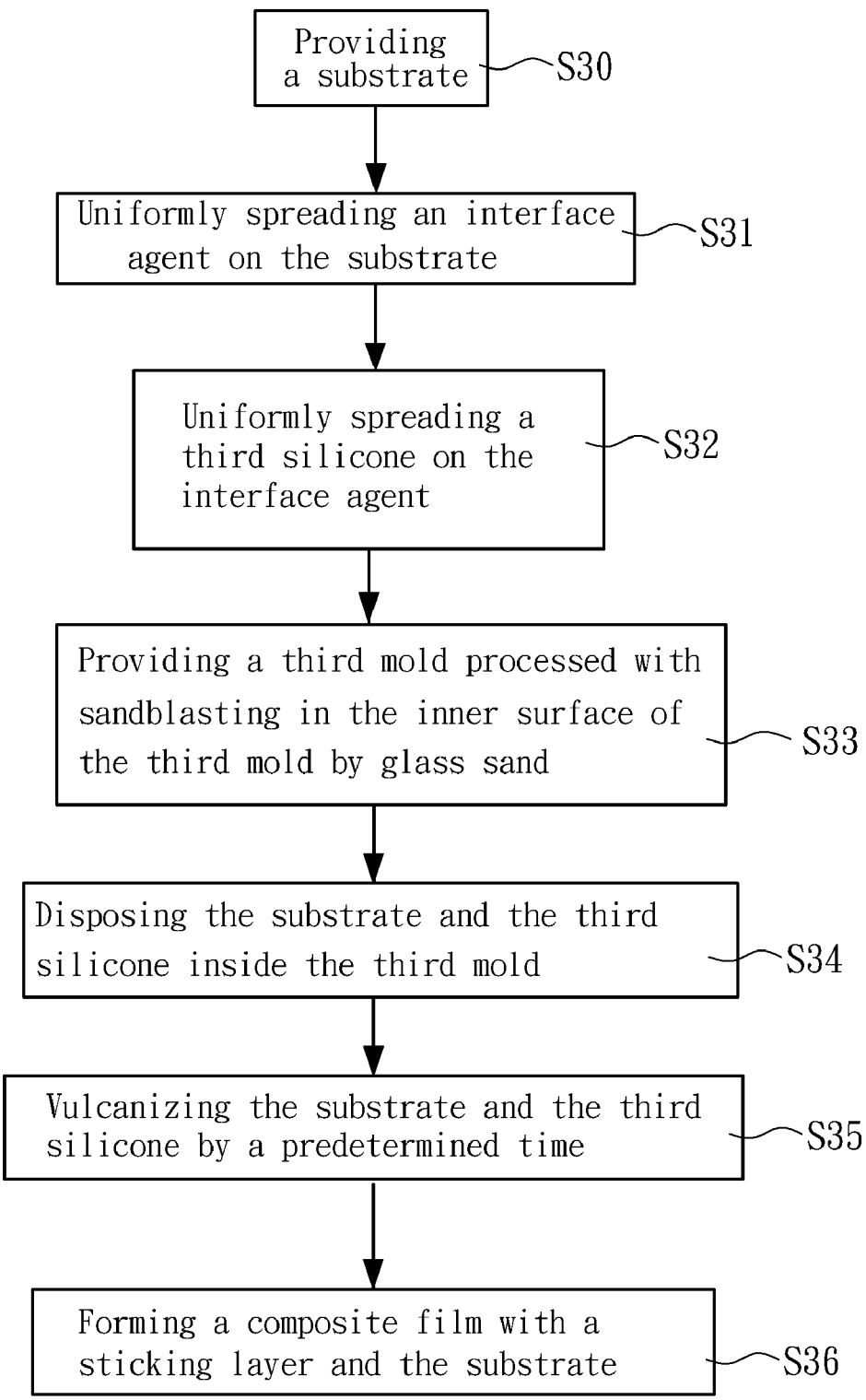
FIG. 1C is diagram of method for manufacturing the C-type composite film.

Next, the other type of composite film is introduced. Please refer to FIG. 1C, FIG. 1C is diagram of method for manufacturing the C-type composite film. As shown in FIG. 1C, the manufacturing method includes the following: step S30, a substrate is provided. Step S31, an interface agent is uniformly spread on the substrate. Wherein, the substrate and the interface agent are the same as described in FIG. 1A.

Then, step S32, a third silicone is uniformly spread on the interface agent. The thickness of the third silicone is 0.1~3.0 mm, and the third silicone is composed of siloxane and silicon dioxide.

Step S33, a third mold processed with sandblasting in the inner surface of the third mold by glass sand is provided. The particle diameter of the glass sand in sandblasting is 125±25 μm.

Step S34, the substrate and the third silicone are disposed inside the third mold so that the third silicone is contacted to the inner surface of the third mold.

Step S35, the substrate and the third silicone are vulcanized with 34±10 kg/cm2 of vulcanizing pressure and 115±7° C. of vulcanizing temperature for a predetermined time of as long as 70~130 seconds.

Figure 2C:
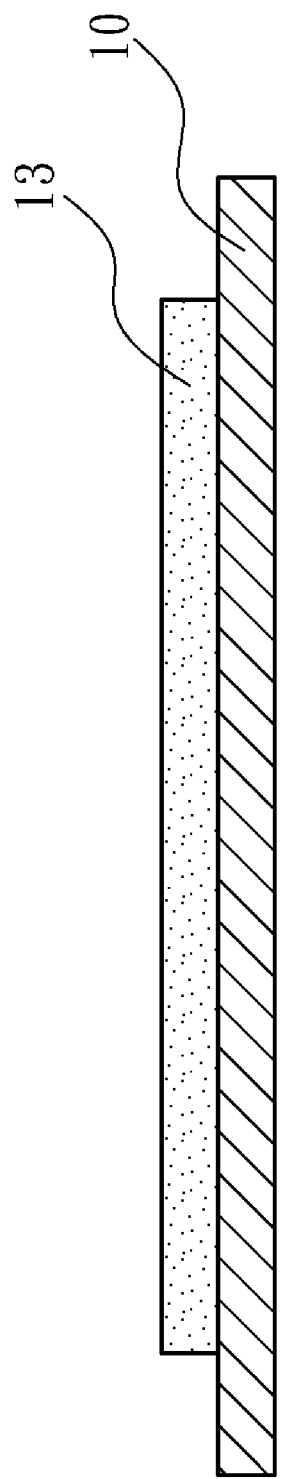
FIG. 2C is diagram of configuration of C-type composite film.

Finally, step S36, after vulcanization, the third silicone and the substrate can be translated into a C-type composite film 3 with a sticking layer 13 and substrate 10, where the C-type composite film 3 is shown in FIG. 2C. As for the difference between A-type composite film 1 and C-type composite film 3, it's all about the distinct diameter of sandblasting particles which the first/third mold is bombarded, and all about the third silicone which is utilized to form the C-type composite film 3. When the third silicone is vulcanized and then translated into the sticking layer 13, the sticking layer 13 can have stickiness, so that the C-type composite film 3 may be pasted on rough surface such as wall, wood or paper etc. And, as experiment shown, the C-type composite film 3 may be repeatedly used for several times. If tiny particles such as dust or sand are attached on the sticking layer 13, the sticking layer 13 can be regained its stickiness as long as been cleaned by water. Furthermore, the experiment also shows that it will not have any piece of the sticking layer 13 left when the C-type composite film 3 is separated from the rough surface. Additionally, in order to show the stickiness the C-type composite film 3 may have, the experiment of sustainable drawing force of C-type composite film 3 is also carried out. The experimental data is shown in Table 2 and the result of the average horizontally sustainable force which C-type composite film 3 can sustain is 0.051 kg/cm2.

TABLE 2

| Experiment No. | 1 | 2 | 3 | 4 | 5 |
|---|---|---|---|---|---|
| drawing force (kg/cm$^2$) | 0.047 | 0.051 | 0.041 | 0.059 | 0.060 |
| Experiment No. | 6 | 7 | 8 | 9 | 10 |
| drawing force (kg/cm$^2$) | 0.057 | 0.053 | 0.052 | 0.043 | 0.046 |

✕ Horizontally sustainable drawing force is 0.051 kg/cm$^2$ in average

Figure 3A:
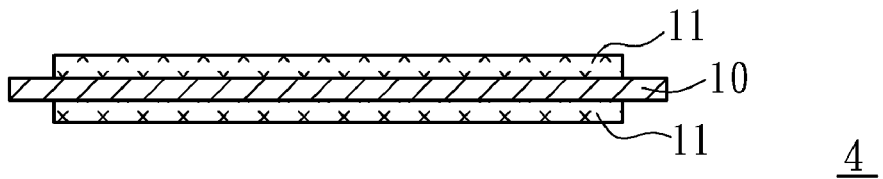
FIG. 3A is diagram of configuration of A/A-type composite film.
Figure 3B:
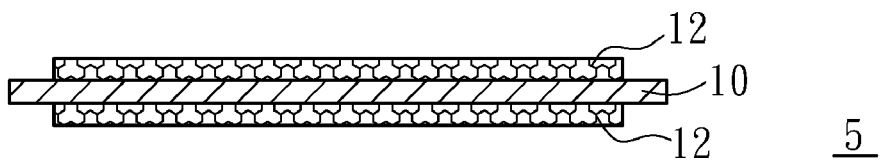
FIG. 3B is diagram of configuration of B/B-type composite film.
Figure 3C:
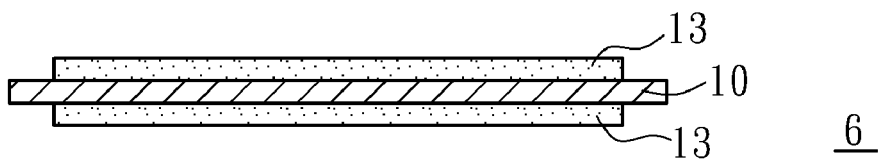
FIG. 3C is diagram of configuration of C/C-type composite film.
Figure 3D:
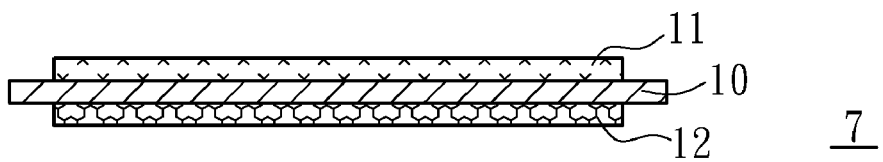
FIG. 3D is diagram of configuration of A/B-type composite film.
Figure 3E:
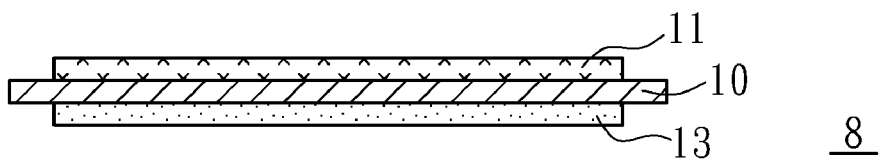
FIG. 3E is diagram of configuration of A/C-type composite film.
Figure 3F:
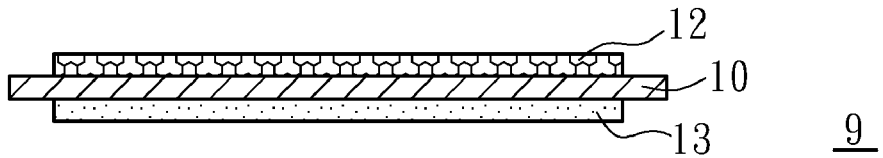
FIG. 3F is diagram of configuration of B/C-type composite film.

Next, technical feature of the aforementioned three composite films can be combined. Please refer to FIG. 3A~3F, FIG. 3A is diagram of configuration of A/A-type composite film; FIG. 3B is diagram of configuration of B/B-type composite film; FIG. 3C is diagram of configuration of C/C-type composite film; FIG. 3D is diagram of configuration of A/B-type composite film; FIG. 3E is diagram of configuration of A/C-type composite film; FIG. 3F is diagram of configuration of B/C-type composite film. Based on the previous method, the substrate 10 is processed twice with the method as shown in FIG. 1A, forming one writing layer 11 on upper face of the substrate 10 and another writing layer 11 on lower face of the substrate 10 respectively, then becoming A/A-type composite film 4 which is shown in FIG. 3A. The substrate 10 is processed twice with the method as shown in FIG. 1B, forming one attaching layer 12 on upper face of the substrate 10 and another attaching layer 12 on lower face of the substrate 10 respectively, then becoming B/B-type composite film 5 which is shown in FIG. 3B. The substrate 10 is processed twice with the method as shown in FIG. 1C, forming one sticking layer 13 on upper face of the substrate 10 and another sticking layer 13 on lower face of the substrate 10 respectively, then becoming C/C-type composite film 6 which is shown in FIG. 3C. The substrate 10 is processed with the method as shown in FIG. 1A and another method as shown in FIG. 1B respectively, forming one writing layer 11 on upper face of the substrate 10 and one attaching layer 12 on lower face of the substrate 10, then becoming A/B-type composite film 7 which is shown in FIG. 3D. The substrate 10 is processed with the method as shown in FIG. 1A and another method as shown in FIG. 1C respectively, forming one writing layer 11 on upper face of the substrate 10 and one sticking layer 13 on lower face of the substrate 10, then becoming A/C-type composite film 8 which is shown in FIG. 3E. The substrate 10 is processed with the method as shown in FIG. 1B and another method as shown in FIG. 1C respectively, forming one attaching layer 12 on upper face of the substrate 10 and one sticking layer 13 on lower face of the substrate 10, then becoming B/C-type composite film 9 which is shown in FIG. 3F.

Figure 5:
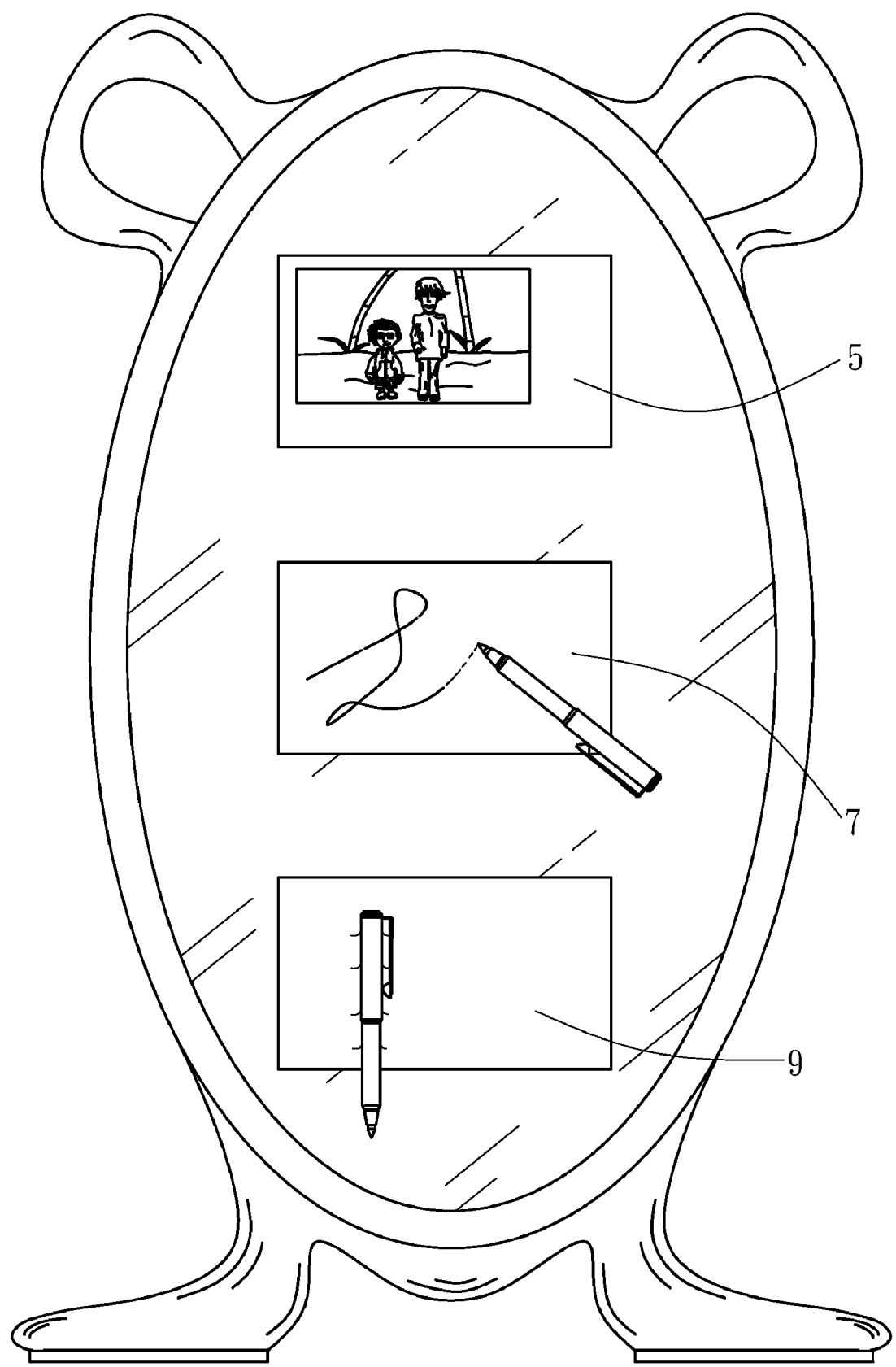
FIG. 5 is diagram of applications of B/B-type, A/B-type and B/C-type composite film.

Then, the usage of these aforementioned composite films is addressed. First, the A/A-type composite film 4 as shown in FIG. 3A has two writing layers 11 disposed on two faces, which can be served as writing plate or writing sheet, capable of being daubed, scrawled, painted by artist, drafted, taken notes, or easily carried to write down or revise. Moreover, please refer to FIG. 5 as well as FIG. 3B, FIG. 3D and FIG. 3F simultaneously; FIG. 5 is diagram of applications of B/B-type, A/B-type and B/C-type composite film. The B/B-type composite film 5, A/B-type composite film 7 and B/C-type composite film 9 can attach to mirror with their attaching layers 12 by means of pressure difference. Then, outer face of the B/B-type composite film 5 which is an attaching layer 12 can adhere to a smooth paper such as photo. Outer face of the A/B-type composite film 7 which is a writing layer 11 can be written or painted with any kind of marker. Outer face of the B/C-type composite film 9 which is a sticking layer 13 can stick together with something rough or irregular shaped; e.g. a pen is stuck on the sticking layer 13 of the B/C-type composite film 9.

Figure 6:
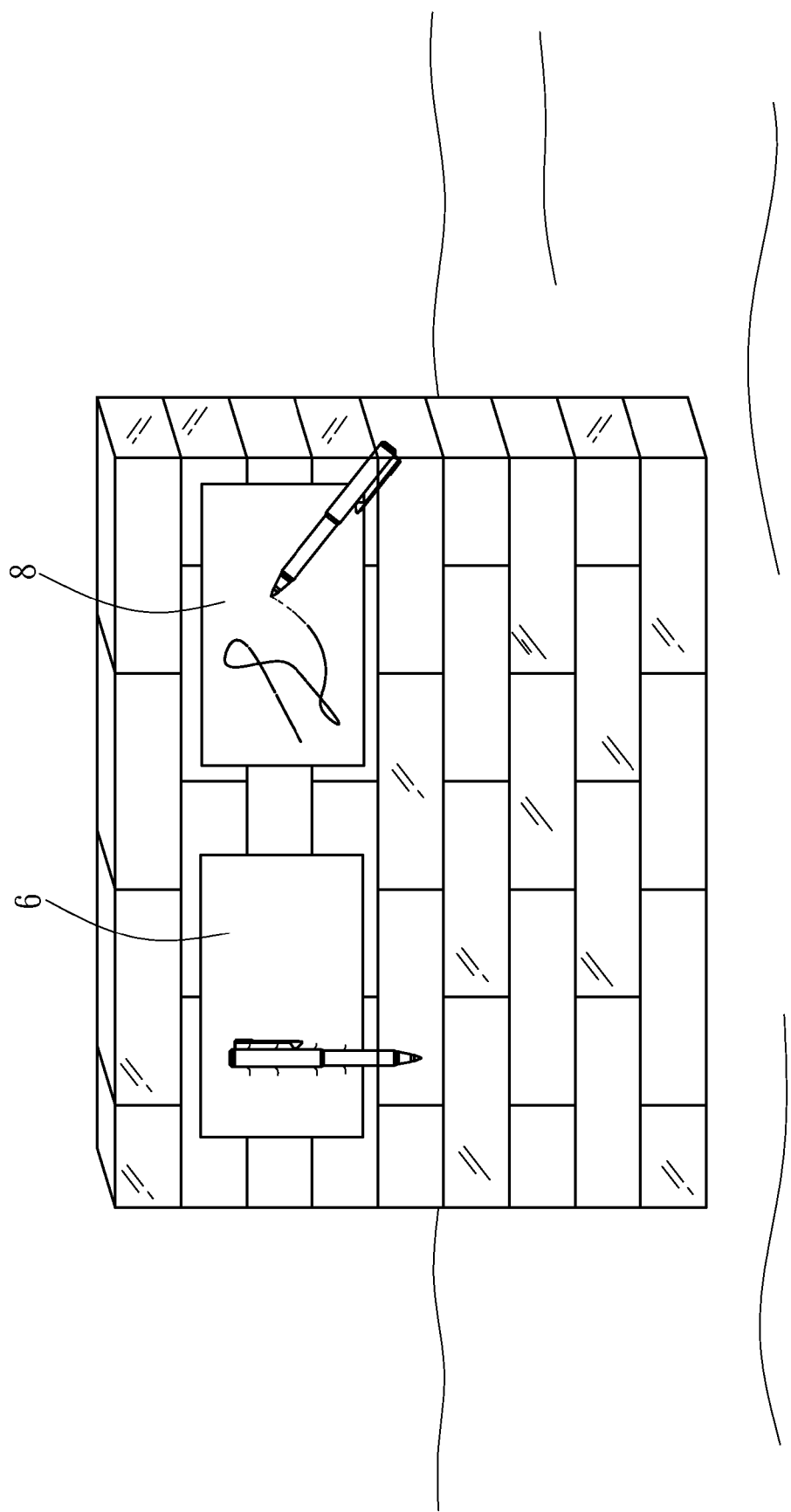
FIG. 6 is diagram of applications of C/C-type and A/C-type composite film.

Additionally, please refer to FIG. 6 as well as FIG. 3C and FIG. 3E simultaneously; FIG. 6 is diagram of applications of C/C-type and A/C-type composite film. The C/C-type composite film 6 and A/C-type composite film 8 can be pasted on a rough wall with their sticking layers 13. Then, outer face of the C/C-type composite film 6 which is a sticking layer 13 can paste other object rough or irregular shaped. Outer face of the A/C-type composite film 8 which is a writing layer 11 can be written or painted. Besides, the C/C-type composite film 6 and A/C-type composite film 8 also can be pasted on the door or refrigerator for fun, puzzle or entertainment purpose.

In other embodiments, the aforementioned substrate 10 can be colored or printed with picture, so that these composite films of present invention may have beautiful appearance which can be capable of decorating or beautifying. This would definitely broaden its usage.

Summarily, the composite films can have functions of writing, attaching or sticking. Thus, when these layers are combined, usage of these composite films can be diversified. Moreover, the manufacturing method of these composite films can be achieved by one process incorporating distinct raw materials or distinct mold; then, different types of composite films may be produced. Therefore, manufacturing method of present invention may have enormous benefit in business.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

I claim:

1. A method for manufacturing composite film, comprising:
   providing a substrate;
   uniformly spreading an interface agent on the substrate;
   uniformly spreading a silicone compound on the interface agent;
   providing a first mold processed with sandblasting in the inner surface of the first mold by glass sand;
   disposing the substrate and the silicone compound inside the first mold so that the silicone compound is contacted to the inner surface of the first mold;
   vulcanizing the substrate and the silicone compound by a predetermined time;
   forming a composite film with a writing layer and the substrate;
   characterized in that the silicone compound is uniformly mixed with 37.5% of first silicone, 37.5% of second silicone and 25% of dimethicone, and the glass sand is composed of particles with diameter of 75±25 µm and 125±25 µm by proportion of 1:9; wherein the first silicone is polydimethylsiloxane containing vinyl groups with platinum catalyst and inhibitors, and the second silicone is polydimethylsiloxane containing vinyl groups with fillers of a cross-linker and an inhibitor.

2. The method for manufacturing composite film as claim 1, wherein the vulcanizing pressure is 34±10 kg/cm2 and vulcanizing temperature is 115±7° C.

3. The method for manufacturing composite film as claim 2, wherein the predetermined time is 70~130 seconds.

4. The method for manufacturing composite film as claim 1, wherein the substrate can be plastic, resin or polymer.

5. The method for manufacturing composite film as claim 1, wherein the interface agent is composed of acrylate resin, isopropyl alcohol, ethyl acetate and tolyl silane coupling agent.

6. The method for manufacturing composite film as claim 1, wherein the time of mixing the first silicone, second silicone and the dimethicone is 10~15 minutes.

7. The method for manufacturing composite film as claim 1, wherein the thickness of the silicone compound is 0.1~0.3 mm.

* * * * *